United States Patent [19]

Minatani

[11] Patent Number: 5,184,426
[45] Date of Patent: Feb. 9, 1993

[54] GRINDING WHEEL FORM DEFINING DEVICE

[75] Inventor: Toshiyuki Minatani, Niwa, Japan

[73] Assignee: OKUMA Corporation, Aichi, Japan

[21] Appl. No.: 707,802

[22] Filed: May 30, 1991

[30] Foreign Application Priority Data

May 31, 1990 [JP] Japan .................. 2-142832

[51] Int. Cl.⁵ .............................. B24B 51/00
[52] U.S. Cl. ................... 51/165.71; 51/5 D;
51/165.87; 364/474.06; 364/474.17; 125/11.02;
125/11.06
[58] Field of Search ........... 51/165 R, 165.71, 165.87,
51/165.74, 165.72, 5 D, 325; 125/11.02, 11.06,
11.23; 364/474.06, 474.17

[56] References Cited

U.S. PATENT DOCUMENTS 4,274,231 6/1981 Verega ........................ 51/165.71
5,014,209 5/1991 Nankaku et al. ............... 364/474.18

FOREIGN PATENT DOCUMENTS 0049608 3/1984 Japan ............................. 51/165.71

Primary Examiner—Robert A. Rose

Attorney, Agent, or Firm—Wenderoth, Lind & Ponack

[57] ABSTRACT

A grinding wheel form defining device defines a cross-sectional form of a grinding wheel for grinding works, the cross-sectional form including a grindstone axis. Data storage is provided for storing cross-sectional forms of workpieces which are final forms in a grinding process. A grinding wheel basic form selected out of plural prestored grinding wheel basic forms, which are simple two-dimensional patterns for typical grinding wheel forms, is superimposed on a workpiece form which is read out from the data storage. A form obtained by removing the resultant superimposed form from the grinding wheel basic form is defined as a grinding wheel form. Since the grinding wheel form is defined by utilizing the superimposed form obtained by superimposing the already defined workpiece form and the grinding wheel basic form, even a complicated grinding wheel form can be easily and accurately defined. The use of the grinding wheel form defined by the grinding wheel form defining device allows an NC grinding machine to perform accurate grinding simulation, and allows an automatic programming apparatus to generate an accurate part program for dressing.

4 Claims, 12 Drawing Sheets

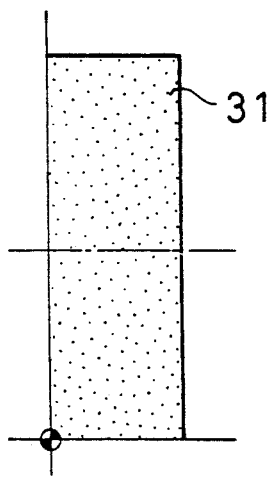 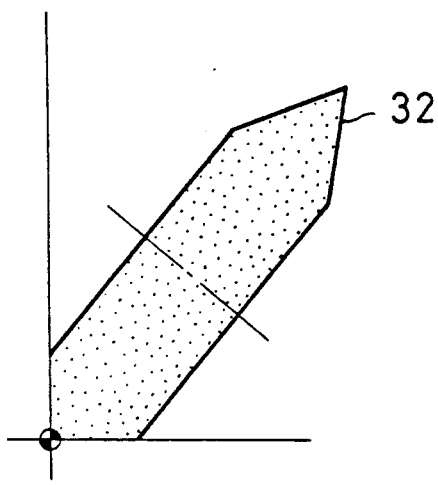 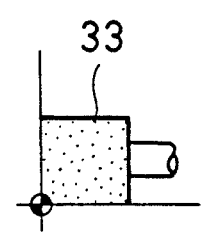
FIG.2A
PRIOR ART
FIG.2B
PRIOR ART
FIG.2C
PRIOR ART

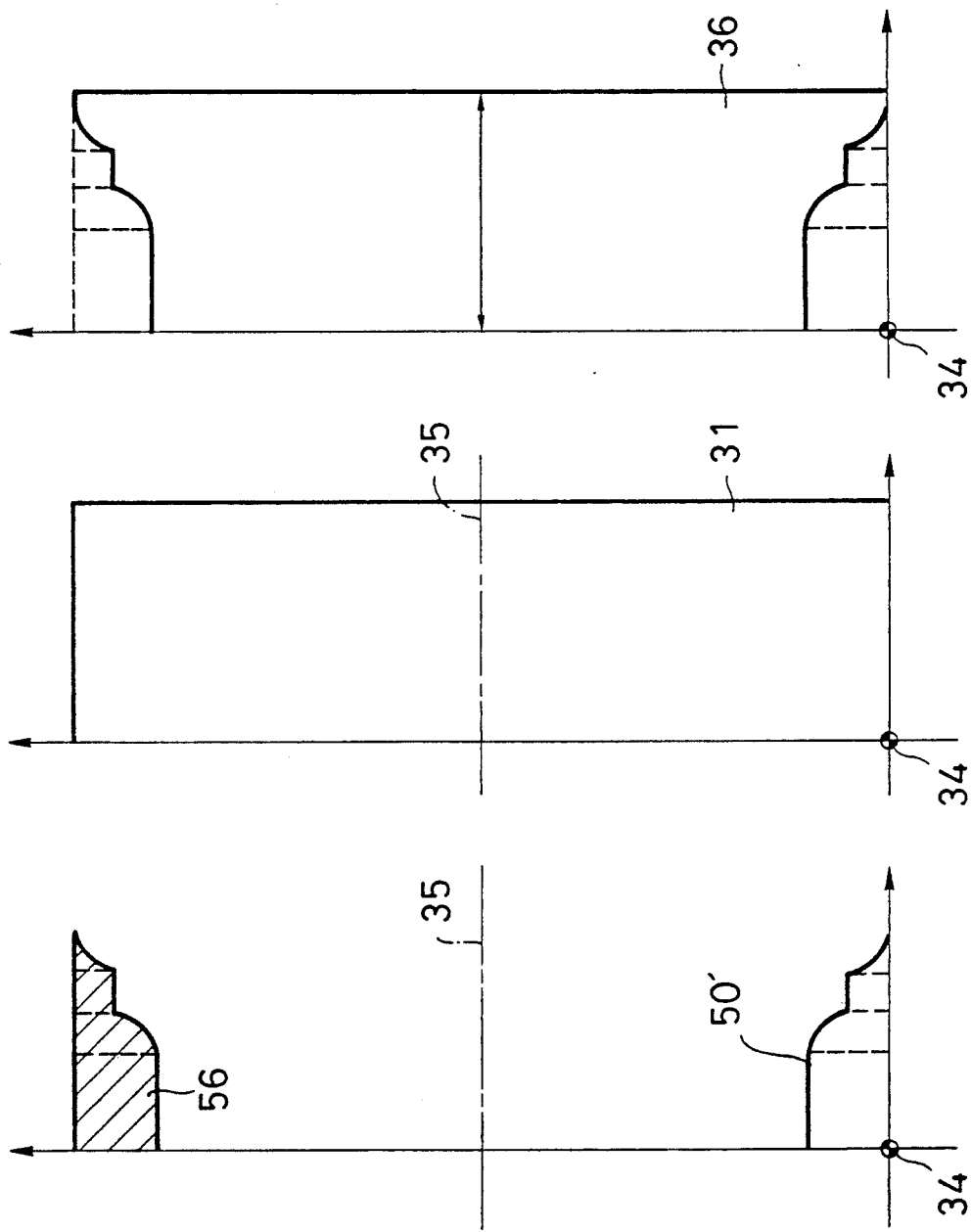

GRINDING WHEEL FORM DEFINING DEVICE

BACKGROUND OF THE INVENTION

1. Field of the Invention

The present invention relates to a grinding wheel form defining device for defining the cross-sectional form of a grinding wheel (hereinafter referred to as "a grinding wheel form"), including the axis of the grindstone, of a grinding wheel for grinding workpieces.

2. Description of the Related Art

FIG. 1 is a block diagram of a conventional grinding wheel form defining device. This grinding wheel form defining device is designed such that an operator controls a grinding wheel form defining device 5, comprising a grinding wheel basic form storing section 8 and a grinding wheel basic form selecting section 13, using an operation panel 3 comprising a CRT 1 capable of graphic display, a keyboard 2, a display control section 7 and an input control section 4.

Particularly, when various types of input data and operation commands SB are input from the keyboard 2 to the input control section 4 by the operator, the input control section 4 converts the various types of the input data and the operation commands SB into a grinding wheel basic form selection command SM and outputs the same to the grinding wheel basic form selecting section 13. The grinding wheel basic form storing section 8 stores a plurality of types of grinding wheel basic forms which are the simple two-dimensional patterns of the typical grinding wheel forms. The grinding wheel basic form selecting section 13 reads out a grinding wheel basic form SI based on the grinding wheel basic form selection command SM from the grinding wheel basic form storing section 8 and sends without alteration the selected grinding wheel basic form SI to a process simulation display section or to a part program generating section as a grinding wheel form SL. Also, the grinding wheel basic form selecting section 13 generates a display control command SE and sends the same to the display control section 7 in order to display the selected grinding wheel basic form SI on the CRT 1. The display control section 7 converts the display control command SE into a display output command SA, and sends the resulting display output command SA to the CRT 1 which displays on a screen the grinding wheel basic form selected by the grinding wheel basic form selecting section 13.

FIGS. 2A, 2B and 2C show examples of the grinding wheel basic form stored in the grinding wheel basic form storing section 8. FIG. 2A shows a plain type grinding wheel 31. FIG. 2B shows an angle type grinding wheel 32. FIG. 2C shows a grinding wheel 33 used for internal grinding. Since these basic forms 31 to 33 are the patterned ones, they can be defined easily by the input of only basic data such as an external diameter, a width of the grinding wheel or the like.

FIGS. 3 and 4 are respectively block diagrams of an automatic programming apparatus 14 and a numerical control (NC) grinding machine 15, each of which incorporates the aforementioned grinding wheel form defining device 5. In the automatic programming apparatus 14 shown in FIG. 3, the grinding wheel form SL defined by the grinding wheel form defining device 5 is read in a part program generating section 9 which analyzes the grinding wheel form SL to thereby generate a part program for dressing. In the NC grinding machine 15 shown in FIG. 4, the grinding wheel form SL defined by the grinding wheel form defining device 5 is read in a process simulation display section 11 which analyzes the grinding wheel form SL to thereby perform grinding simulation.

The cross-sectional form (hereinafter referred to as "a workpiece form") of a workpiece which is the final form in the grinding process, prepared by an automatic programming apparatus or the like, is generally defined by either of the following methods:

(1) A method which uses one-dimensional form elements such as a straight line, a taper, an arc or the like.

(2) A method which uses two-dimensional form elements such as a rectangle, a trapezoid, rounded trapezoid or the like.

In these methods, complicated workpiece forms can be easily defined on the basis of the dimensions or the like described on the process drawings. For example, in the case of a workpiece form 20 shown in FIG. 5, an objective workpiece form can be defined using the two-dimensional form elements, i.e., four rectangles and two rounded trapezoids, and by designating the dimensions for each form element.

The conventional grinding wheel form defining device 5 has no function for defining the workpiece form, unlike the automatic programming apparatus, because the dimensions of the grinding wheel form are not described on the process drawing and because the workpiece form defining method cannot be utilized to define the grinding wheel form without being changed. Therefore, in a case where the grinding wheel form used in an actual grinding process is a complicated one which is not stored in the grinding wheel basic form storing section 8, the grinding wheel form defining device 5 cannot define the grinding wheel form accurately. In the grinding process in which, for example, a machined surface 22 of the workpiece form 20 as shown in FIG. 5 is ground in a one plunge cutting process (hereinafter referred to as "a total form plunging"), a complicated grinding wheel form such as that shown in FIG. 6A is required. Thus, the conventional grinding wheel form defining device 5 temporarily selects the plane type grinding wheel 31 as shown in FIG. 2A and defines it as the grinding wheel form. In the simulation of the total form plunging performed at that time by the NC grinding machine 15, the grinding wheel and the workpiece are displayed in a collided state as shown in FIG. 6B. This lessens the advantage of the simulation such as the interference checking function.

In the automatic programming apparatus 14, since the automatic programming function cannot be used to generate the part program for the dressing which uses a single point diamond, the operator must generate the part program for dressing by referring to the process drawing. This leads to generation of programming errors and requires a large amount of time.

SUMMARY OF THE INVENTION

In view of the aforementioned problems of the conventional techniques, an object of the present invention is to provide a grinding wheel form defining device which enables a complicated grinding wheel form to be easily defined. To this end, the present invention provides a grinding wheel form defining device for defining a cross-sectional form of a grinding wheel for grinding workpieces, the cross-sectional form including a grindstone axis. The grinding wheel form defining device includes a storage means for storing cross-sectional forms of workpieces which are the final forms in the grinding process. A grinding wheel basic form selected from a plurality of types of grinding wheel basic forms which are simple two-dimensional patterns of typical grinding wheel forms is superimposed on the workpiece form which is read out from the storage means, and a form obtained by removing the resultant superimposed form from the grinding wheel basic form is defined as a grinding wheel form.

The nature, principle and utility of the invention will become more apparent from the following detailed description when read in conjunction with the accompanying drawings.

BRIEF DESCRIPTION OF THE DRAWINGS

In the accompanying drawings:

FIGS. 2A to 2C show examples of grinding wheel basic forms;

FIGS. 9A to 9C, FIG. 10, FIG. 11, FIG. 12 and FIGS. 13A to 13C are views explaining the operation of the grinding wheel form defining device according to the present invention, respectively;

DETAILED DESCRIPTION OF THE PREFERRED EMBODIMENTS

Figure 1:
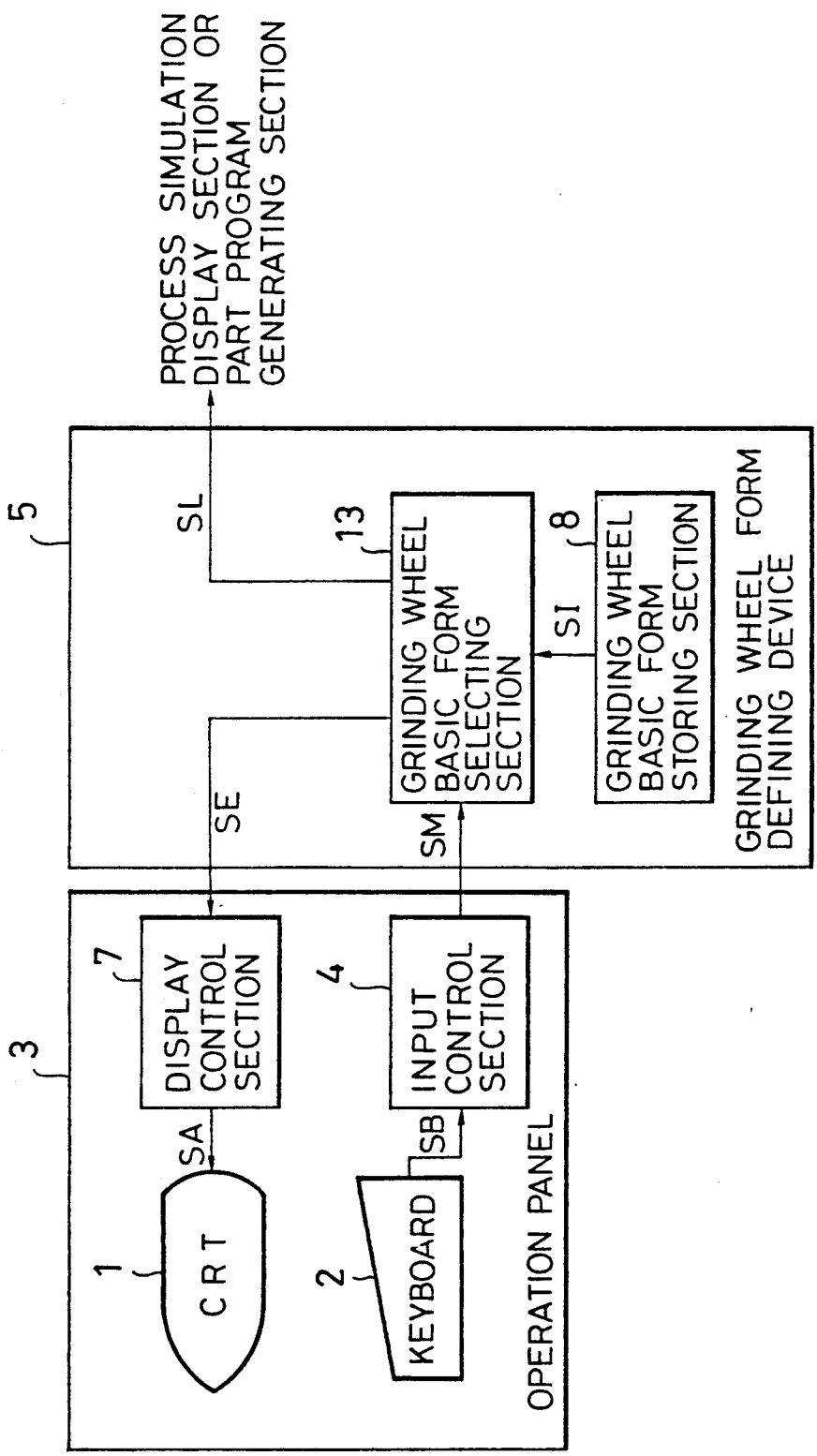
FIG. 1 is a block diagram of a conventional grinding wheel form defining device.
Figure 3:
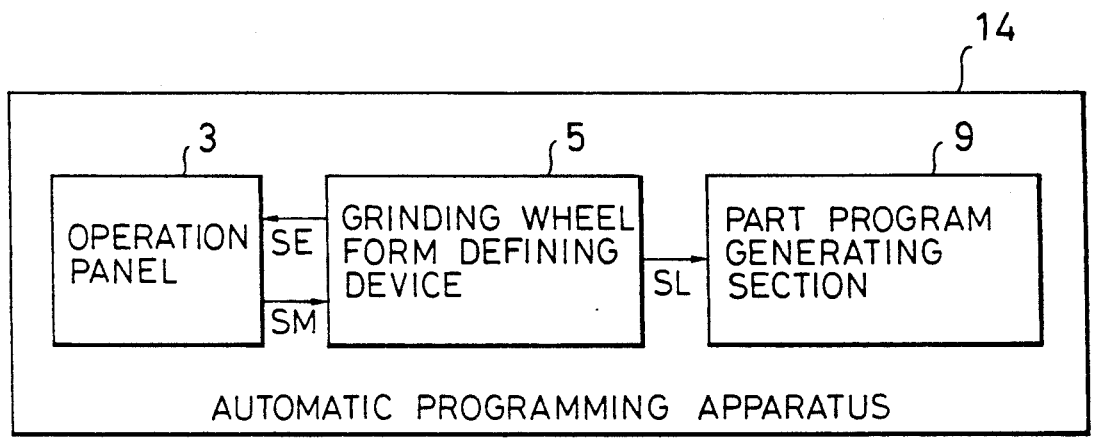
FIGS. 3 and 4 are respectively block diagrams of the automatic programming apparatus and NC grinding machine, each of which incorporates the grinding wheel form defining device.
Figure 4:
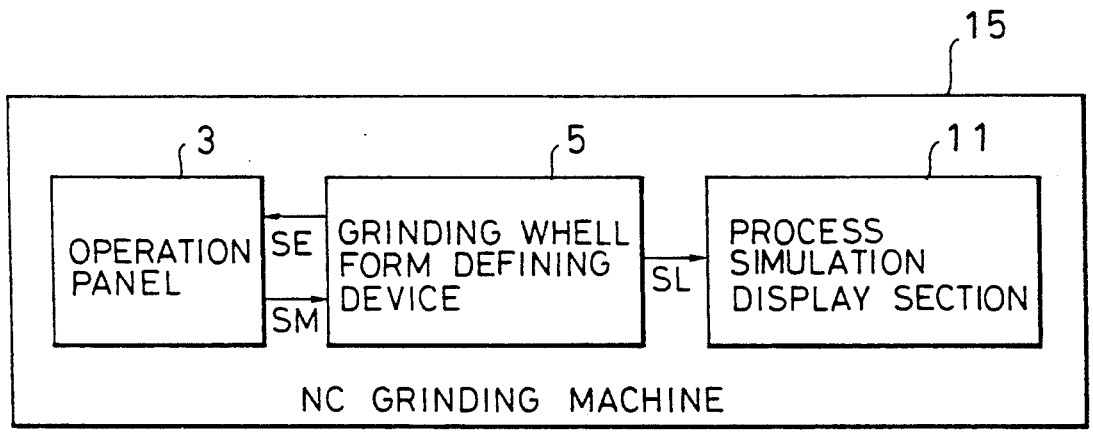
Figure 7:
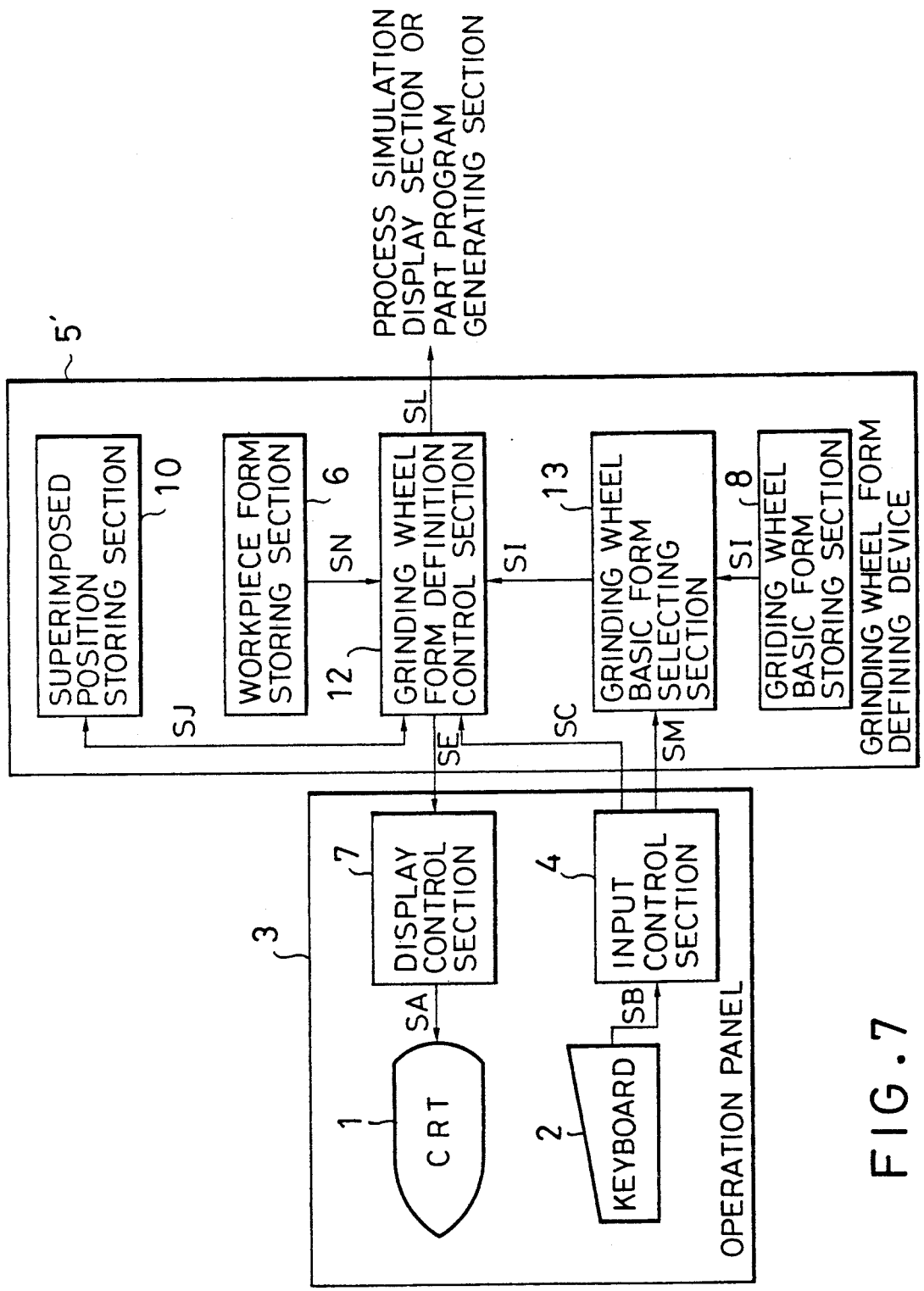
FIG. 7 is a block diagram showing an embodiment of a grinding wheel form defining device according to the present invention.

FIG. 7 is a block diagram showing an embodiment of a grinding wheel form defining device 5' according to the present invention. The grinding wheel form defining device 5' shown in FIG. 7 differs from that shown in FIG. 1 in that it further includes a superimposed position storing section 10, a workpiece form storing section 6 and a grinding wheel form definition control section 12.

Various types of input data and operation commands SB which are input by an operator from the keyboard 2 are input to the input control section 4 which analyzes the input data and the operation commands, divides them into a grinding wheel basic form selecting command SM sent to the grinding wheel basic form selecting section 13 and the grinding wheel form defining command SC sent to the grinding wheel form definition control section 12, respectively. The grinding wheel basic form selecting section 13 selects the grinding wheel basic form SI based on the grinding wheel basic form selecting command SM from the grinding wheel basic form storing section 8 and sends the selected grinding wheel basic form SI to the grinding wheel form definition control section 12. The grinding wheel form definition control section 12 reads out a machined command form SN based on the grinding wheel form defining command SC from the machined article form storing section 6, and writes a superimposed position SJ at which the workpiece form SN and the grinding wheel basic form SI are superimposed in the superimposed position storing section 10. Furthermore, if the grinding wheel form defining command SC contains a correcting command for correcting the superimposed form obtained by superimposing the workpiece form SN on the grinding wheel basic form SI, correction of the superimposed form is conducted. The grinding wheel form SL generated as a consequence of the aforementioned analysis of the grinding wheel form defining command is sent out to the process simulation display section or to the part program generating section. At the same time, the grinding wheel form definition control section 12 generates the display control command SE and sends it to the display control section 7 which displays the workpiece form SN and the grinding wheel basic form SI on the CRT 1.

The display control section 7 converts the display control command SE into the display output command SA and sends it to the CRT 1 so that the workpiece form SN and the grinding wheel basic form SI can be displayed on a screen of the CRT 1.

The automatic programming apparatus and the NC grinding machine, each of which incorporates the above-described grinding wheel form defining device 5', respectively include the part program generating section and the process simulation display section, like the conventional ones, and respectively generate the part program for dressing and perform the grinding simulation on the basis of the grinding wheel form SL defined by the grinding wheel form defining device 5'.

Figure 8A:
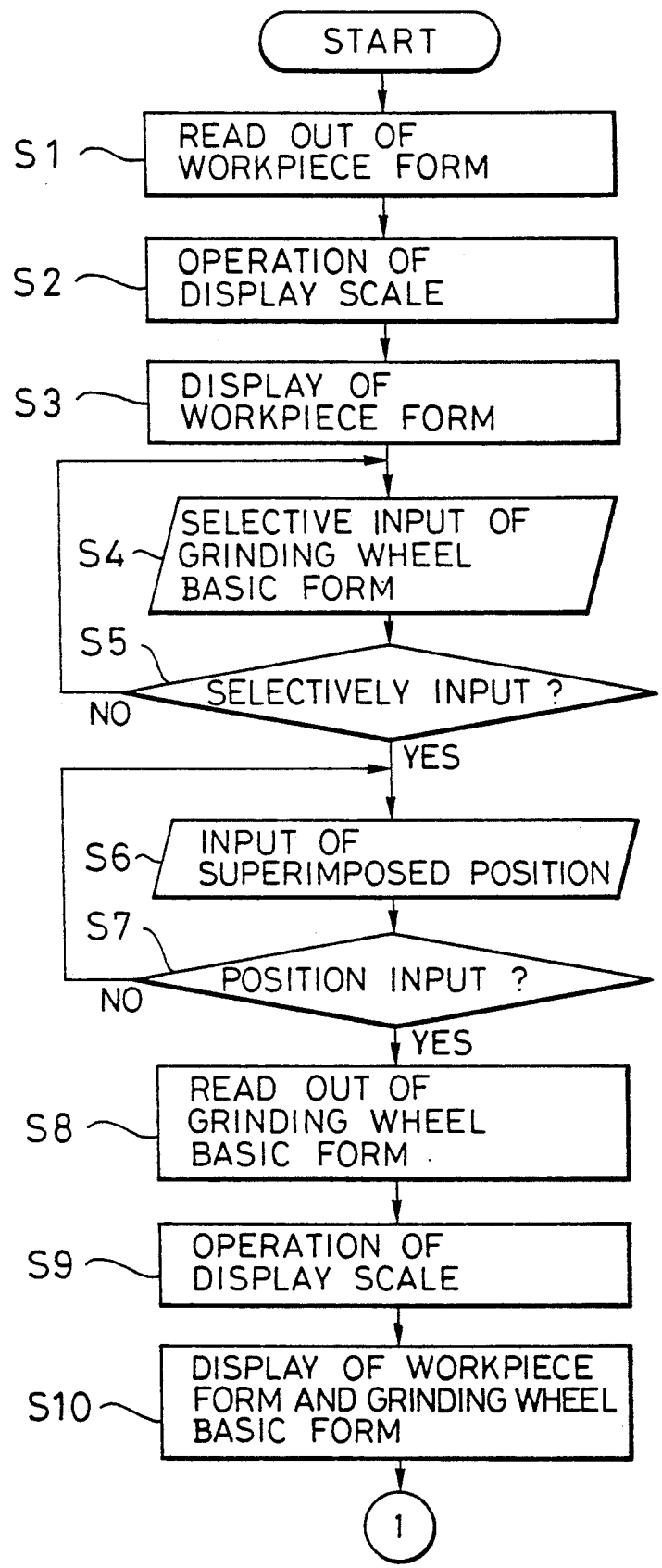
FIGS. 8A and 8B are flow charts showing the operation of a major component of the grinding wheel form defining device according to the present invention.
Figure 8B:
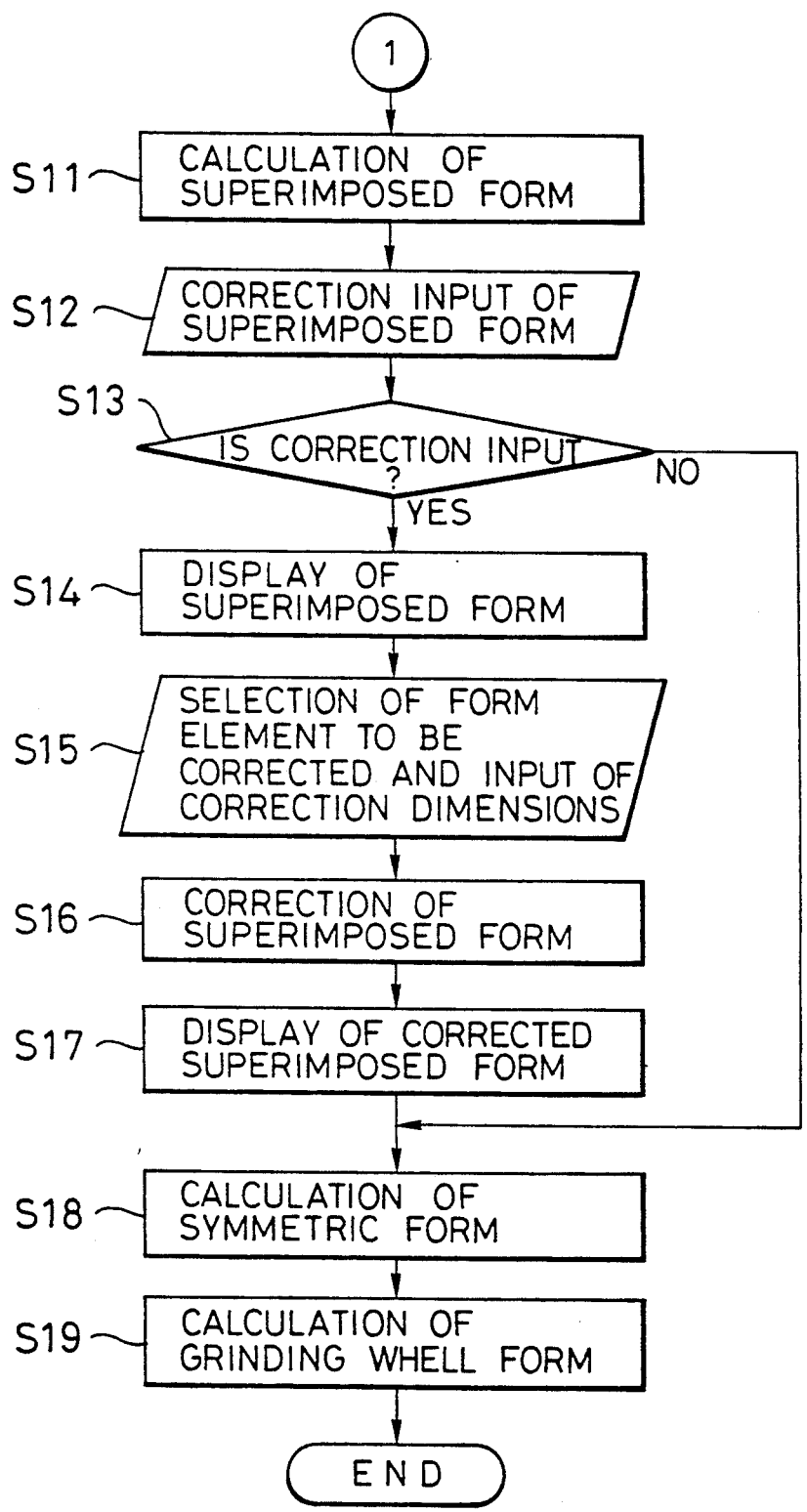

The operation of the grinding wheel form definition control section 12, which is the major component of the grinding wheel form defining device 5' arranged in the manner described above, will be described below with reference to FIGS. 8A and 8B.

Figure 5:
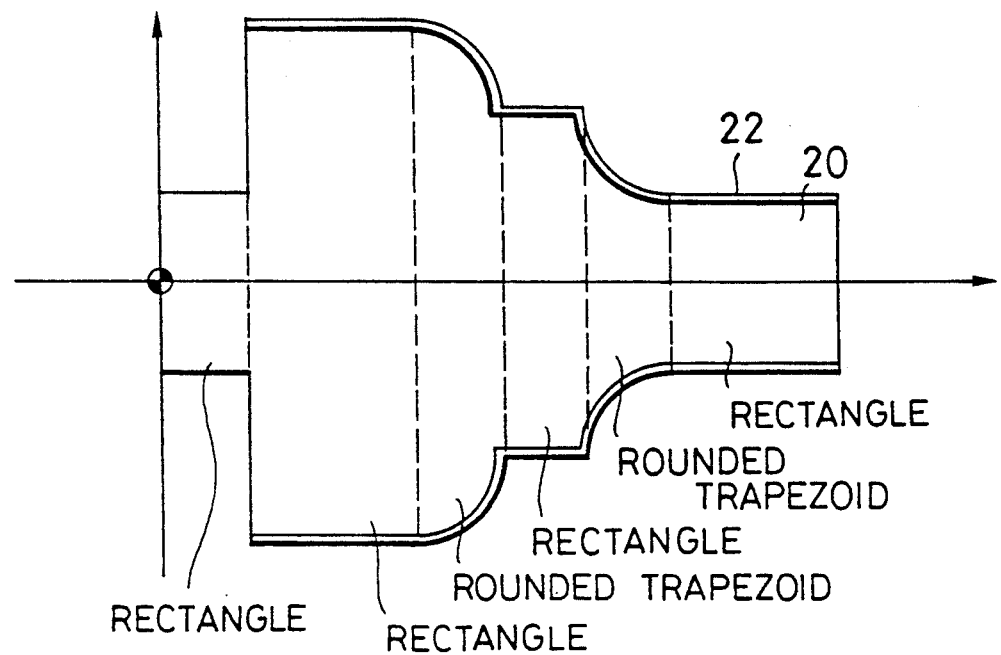
FIG. 5 is a view showing one example of the workpiece form.
Figure 9A:
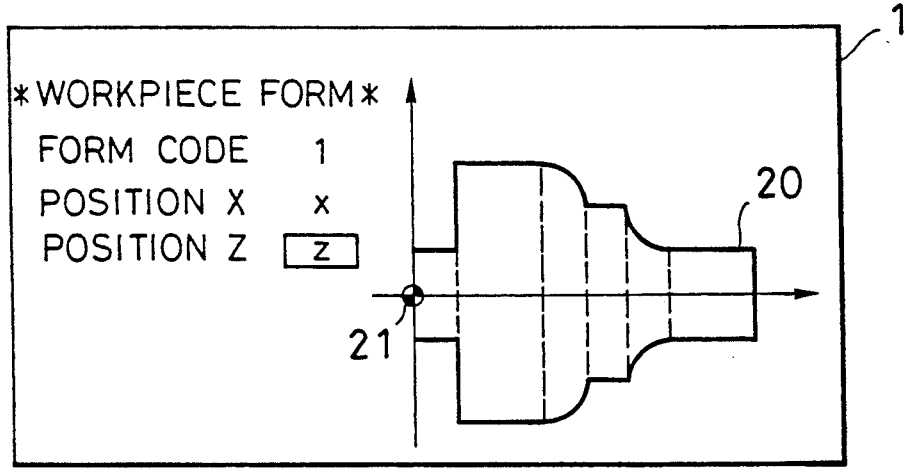
Figure 9B:
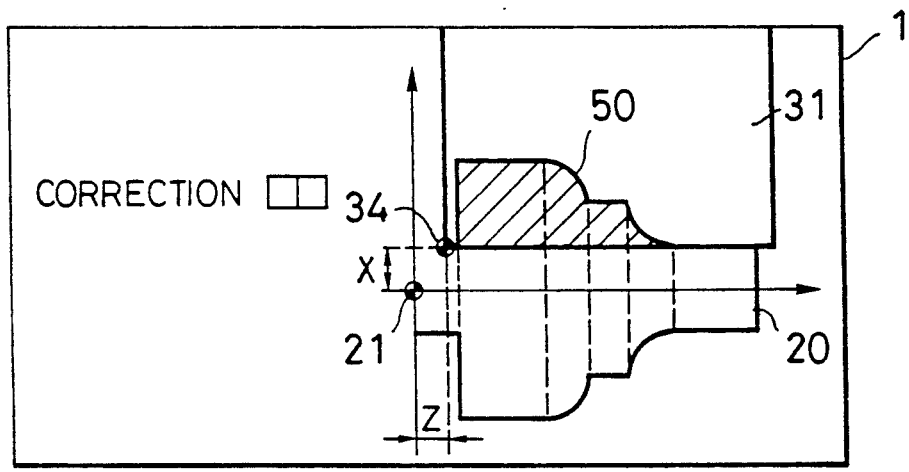
Figure 10:
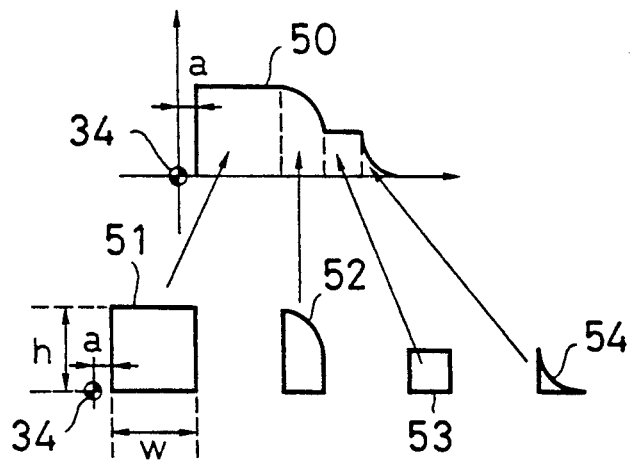
Figure 11:
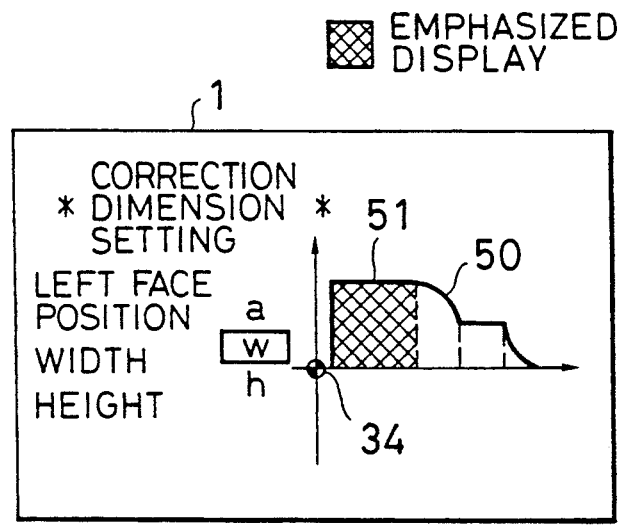

First, the machined work form 20 shown in, for example, FIG. 5 is read out from the workpiece form storing section 6 (Step S1), and then an adequate display scale is obtained from the dimensions of the workpiece form 20 (Step S2). Thereafter, the display control command for displaying the workpiece form 20 in an enlarged or reduced fashion using the obtained scale is sent to the display control section 7 so that the workpiece form 20 can be displayed on the CRT 1 in the manner shown in, for example, FIG. 9A (Step S3). The operator first inputs the code number (which is "1" in this example) applied to the corresponding grinding wheel basic form in the "form code column" (Steps S4 and S5), and then inputs the relative positions (which are "x and z" in this example) of a reference position 34 of the grinding wheel basic form relative to reference positions 21 of the workpiece form 20 in the "position X and position Z column" (Steps S6 and S7). After the grinding wheel basic form 31 selected on the basis of the form code "1" has been read out (Step S8), the scale which allows the grinding wheel basic form 31 to be superimposed on the workpiece form 20 at the superimposed position determined by the relative positions "X and Z" is obtained (Step S9). The display control command for displaying the grinding wheel basic form 31 in an enlarged or reduced fashion using the obtained scale is sent to the display control section 7 so that the grinding wheel basic form 31 can be displayed on the CRT 1 in the manner shown in FIG. 9B (Step S10). Next, a superimposed form (indicated by the hatched portion in FIG. 9B) 50 is obtained from the workpiece form 20, the grinding wheel basic form 31, and the superimposed position in the form of form elements 51, 52, 53 and 54 as shown in FIG. 10 (Step S11). Subsequently, correction of the dimensions of the superimposed form 50 is input (Step S12). If no correction is to be made, the process skips to Step S18. If the correction is to be made, the process proceeds to Step S14 (Step S13). In this example, since "1" is input by the operator in the "correction column", the correction of the dimensions of the superimposed form 50 is made, and a superimposed form 50 with a highlighted form element 51 and the dimensions "a, w and h" of the form element 51 are therefore displayed together with the reference position 34 of the grinding wheel basic form as shown in FIG. 11 (Step S14). The form element to be emphasized can be selected from the operation panel 3.

Figure 9C:
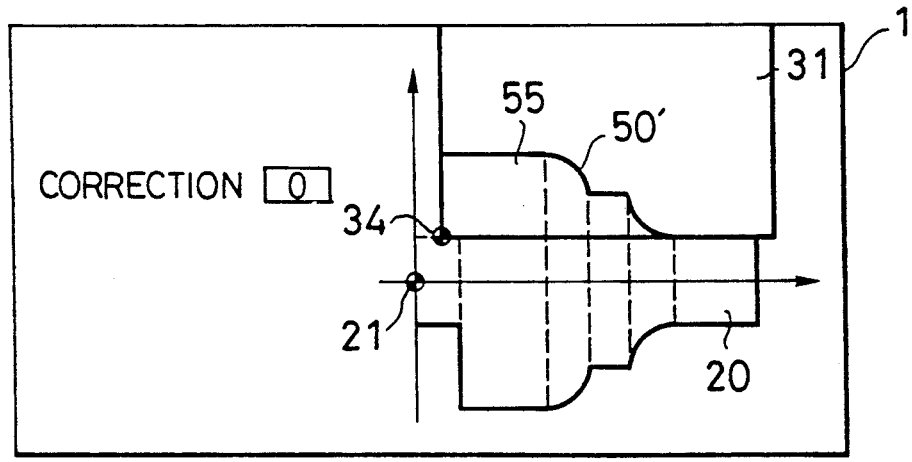
Figure 12:
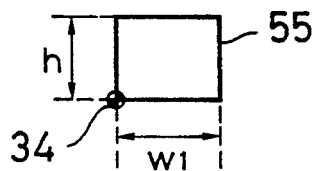

After the correction operation has been performed by the operator, that is, "width" and "left face position" of the form element 51 have respectively been corrected from "w" and "a" to "w1" and "0" (Step S15), a superimposed form 50' containing a form element 55 as shown in FIG. 12, which is the corrected form of the form element 51, is displayed together with the grinding wheel basic form 31 and the workpiece form 20 as shown in FIG. 9C (Step S17). Thereafter, a symmetrical form 56 which is the form obtained by disposing the superimposed form 50' at a position which is symmetric to the position of the superimposed form 50' with respect to an axis 35 of the grinding wheel, as shown in FIG. 13A, is obtained (Step S18). Then, a grinding wheel form 36 shown in FIG. 13C, obtained by removing the symmetric form 56 and the superimposed form 50' from the grinding wheel basic form 31 shown in FIG. 13B, is calculated (Step S19), to thereby complete the grinding wheel form definition control operation.

Figure 14:
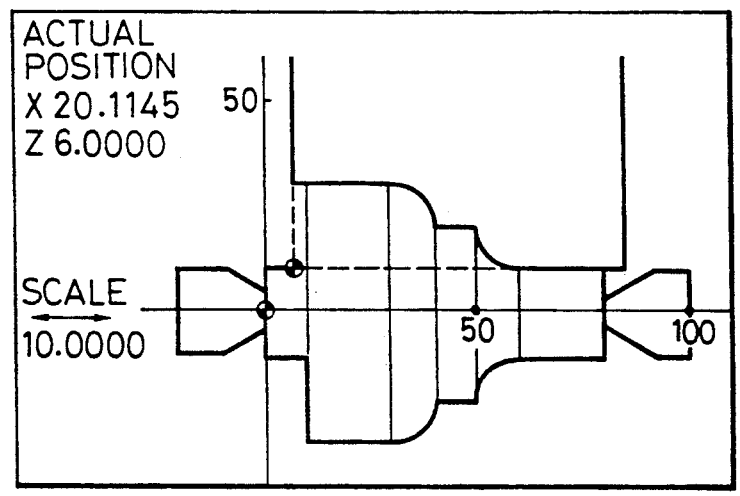
FIG. 14 is a view showing an example of display made in a process simulation conducted by an NC grinding machine which incorporates the grinding wheel form defining device according to the present invention.
Figure 6A:
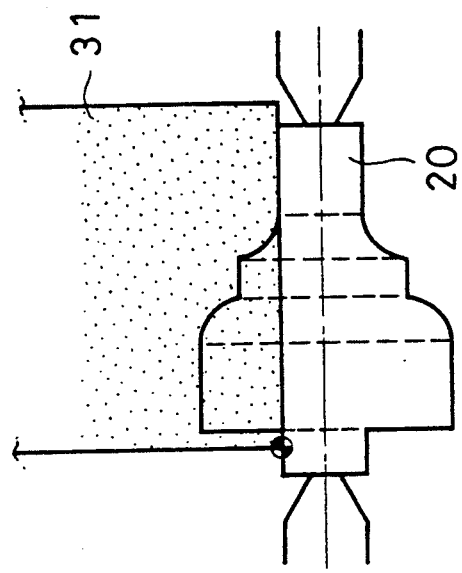
FIGS. 6A and 6B are views explaining a problem experienced by the conventional grinding wheel form defining device.
Figure 6B:
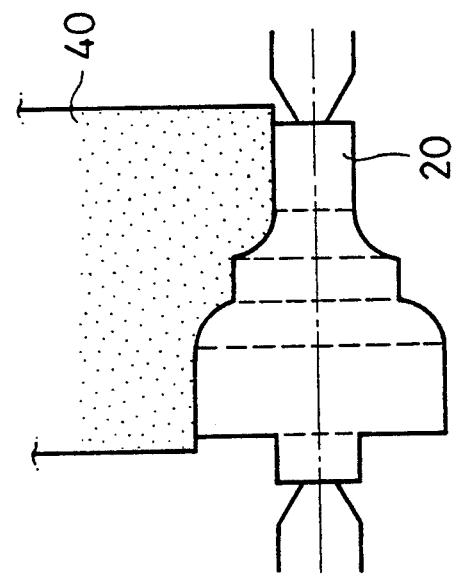

FIG. 14 shows an example of a display made in the grinding simulation for the total form plunging which is conducted by the NC grinding machine with the aforementioned grinding wheel form defining device 5' incorporated therein. The grinding wheel form which is similar to the form of the grinding wheel used in an actual grinding process and which is defined by the grinding wheel form defining device 5' is displayed.

Figure 15:
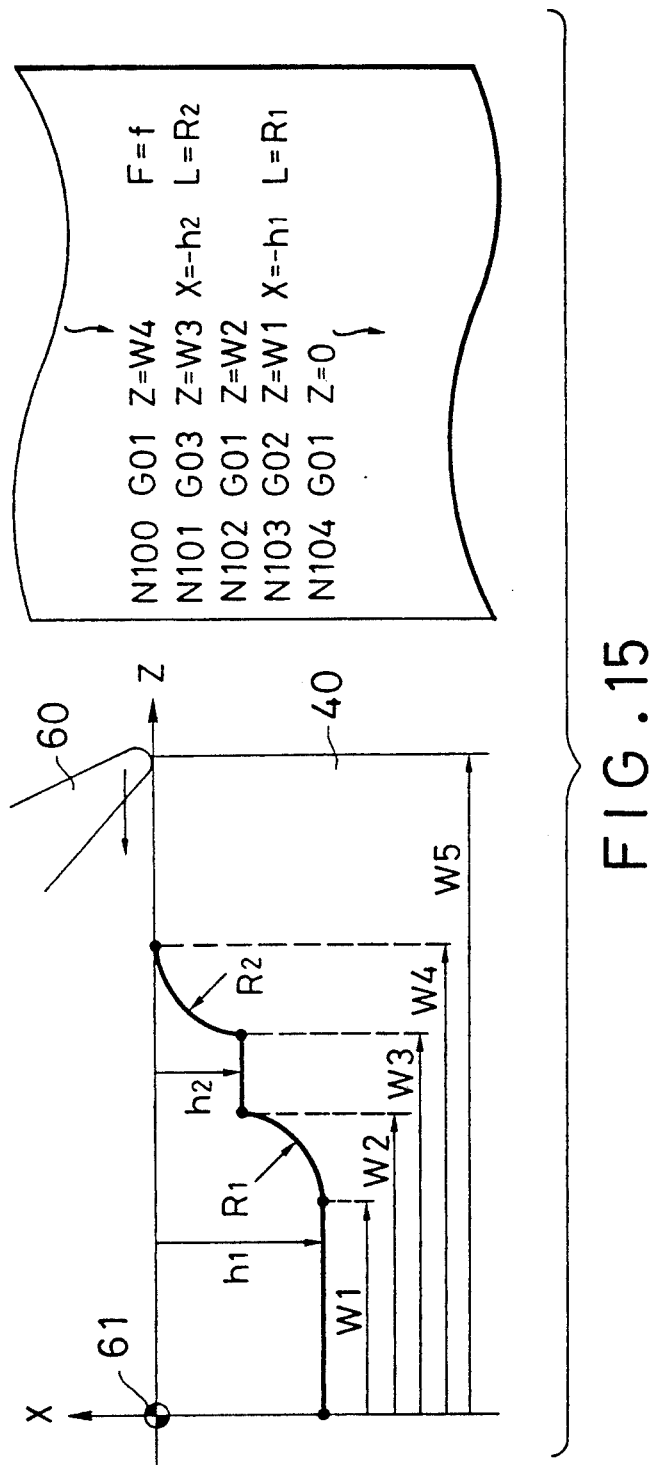
FIG. 15 is a view showing the generation of a part program for dressing by means of an automatic programming apparatus which incorporates the grinding wheel form defining device according to the present invention.

FIG. 15 shows an example of the part program used for dressing a grinding wheel 40 using a single point diamond 60 which is generated by the automatic programming apparatus which incorporates the aforementioned grinding wheel form defining device 5'. The procedures of copying the surface of the grinding wheel 40 by the single point diamond 60 are analyzed by the part program generating section on the basis of the grinding wheel form dimensions w1, w2, w3, w4, w5, h1, h2, R1 and R2 from a dressing part program origin 61 in order to create the part program for dressing.

As will be understood from the foregoing description, it is possible according to the grinding wheel form defining device of the present invention to automatically define a complicated grinding wheel with a high degree of accuracy. Consequently, the burden on the operator can be alleviated. In an NC grinding machine to which the grinding wheel form defining device according to the present invention is applied, the grinding simulation can be performed using the grinding wheel form which is similar to that used in an actual grinding process. This allows the interference checking function or the like to be effectively utilized. In the automatic programming apparatus to which the grinding wheel form defining device according to the present invention is applied, the part program for dressing the grinding wheel used in the actual grinding process can be automatically generated. Consequently, the troublesome work and time required for generating the program can be greatly eliminated.

It should be understood that many modifications and adaptations of the invention will become apparent to those skilled in the art and it is intended to encompass such obvious modifications and changes in the scope of the claims appended hereto.

What is claimed is:

1. An apparatus for defining a cross-sectional form of a grinding wheel for grinding a workpiece, the cross-sectional form including a grindstone axis, said apparatus comprising:

first storage means for storing a plurality of basic grinding wheel forms;

means, responsive to an input command, for selecting a basic grinding wheel form from among the plurality of basic grinding wheel forms stored in said first storage means;

second storage means for storing at least one workpiece cross-sectional form;

definition control means for receiving the basic grinding wheel form selected by said selecting means, for retrieving a workpiece cross-sectional form from said second storage means, for superimposing the received basic grinding wheel form and the retrieved workpiece cross-sectional form to obtain a resultant superimposed form, and for defining as the grinding wheel cross-sectional form a form obtained by removing the superimposed form from the grinding wheel basic form.

2. An apparatus as recited in claim 1, wherein said definition control means includes means, responsive to a correction input command, for correcting dimensions of the superimposed form.

3. An apparatus as recited in claim 1 or 2, wherein a form obtained by removing from the grinding wheel basic form the superimposed form and a symmetric form of the superimposed form with respect to the grinding axis is defined as the grinding wheel cross-sectional form by said definition control means.

4. An apparatus for defining a cross-sectional form of a grinding wheel for grinding a workpiece, the cross-sectional form including a grindstone axis, said apparatus comprising:

an operation panel;

first storage means for storing a plurality of basic grinding wheel forms;

means, responsive to an input command from said operation panel, for selecting a basic grinding wheel form from among the plurality of basic grinding wheel forms stored in said first storage means;

second storage means for storing at least one workpiece cross-sectional form;

definition control means for receiving the basic grinding wheel form selected by said selecting means, for retrieving a workpiece cross-sectional form from said second storage means, for superimposing the received basic grinding wheel form and the retrieved workpiece cross-sectional form to obtain a resultant superimposed form, and for defining as the grinding wheel cross-sectional form a form obtained by removing the superimposed form from the grinding wheel basic form; and, third storage means for storing the superimposed form obtained by said definition control means.

* * * * *